United States Patent [19]

Stanak

[11] Patent Number: 5,632,058
[45] Date of Patent: May 27, 1997

[54] HEATED WIPER BLADE WITH A SCRAPER AND FLUID RELEASE NOZZLE ASSEMBLY

[76] Inventor: Paul Stanak, 67 Waterford Dr., Wheatley Heights, N.Y. 11798

[21] Appl. No.: 695,702

[22] Filed: Apr. 29, 1996

[51] Int. Cl.[6] .................................. B60S 1/46; B60S 1/38
[52] U.S. Cl. ................................ 15/250.04; 15/250.06; 15/250.07; 15/250.4; 15/250.44; 15/250.32; 219/202
[58] Field of Search .............................. 15/250.01, 250.02, 15/250.03, 250.04, 250.05, 250.06, 250.07, 250.08, 250.09, 250.44, 250.451, 250.452, 250.46, 250.361, 250.4, 250.41, 250.32; 219/202, 203

[56] References Cited

U.S. PATENT DOCUMENTS

| 3,790,083 | 2/1974 | Redifer | 15/250.04 |
| 4,387,290 | 6/1983 | Yasuda | 15/250.07 |
| 4,928,345 | 5/1990 | Meltzer et al. | 15/250.06 |
| 5,572,765 | 11/1996 | Guell | 15/250.06 |

FOREIGN PATENT DOCUMENTS

| 2000224 | 8/1969 | France | 15/250.4 |
| 2619633 | 11/1977 | Germany | 15/250.4 |
| 2047079 | 11/1980 | United Kingdom | 15/250.41 |

Primary Examiner—Gary K. Graham

[57] ABSTRACT

A heated wiper blade with a scraper and fluid release nozzle assembly including a wiper arm member that couples to a wiper shaft of an associated vehicle. An elongated wiper blade with an interior heating element is provided. A blade holder member is pivotally mounted to a distal end of the wiper arm member with a fastening bracket, and supports the wiper blade. An electrical conductor is coupled to the wiper arm member for communicating with a battery of an associated vehicle. A heat generating mechanism is in electrical communication with the electrical conductor. The heat generating mechanism couples with the blade holder member and the interior heating element. A scraping blade coupled to a central bracket of the blade holder. Lastly, a fluid release nozzle is attached to the central bracket and spaced from the blade holder for spraying a deicing fluid onto the windshield to assist the scraping blade removal of ice from the windshield of the associated vehicle.

11 Claims, 3 Drawing Sheets

HEATED WIPER BLADE WITH A SCRAPER AND FLUID RELEASE NOZZLE ASSEMBLY

BACKGROUND OF THE INVENTION

1. Field of the Invention

The present invention relates to a heated wiper blade with a scraper and fluid release nozzle assembly and more particularly pertains to melting ice and mechanically clearing ice and fluid from a windshield with the aid of a chemical deicer.

2. Description of the Prior Art

The use of a wiping device is known in the prior art. More specifically, wiping devices heretofore devised and utilized for the purpose of cleaning windshield are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,967,437 to Morse discloses a heated wiper blade assembly. U.S. Pat. No. 4,928,345 to Meltzer and DiIoia discloses a heated windshield wiper blade and holder. U.S. Pat. No. 4,497,083 to Nielsen and Caffrey discloses a heated windshield wiper. U.S. Pat. No. 3,619,556 to Deibert and Reister discloses a electrically heated weatherproof wiper blade. U.S. Pat. No. 3,408,678 to Linder discloses a windshield wiper assembly. Lastly, U.S. Pat. No. 2,869,166 to Eaves discloses a heating or deicing unit for glazed windows.

While these devices fulfill their respective, particular objectives and requirements, the aforementioned patents do not describe a heated wiper blade with a scraper and fluid release nozzle assembly that allows deicing of the wiper blade and deicing of the windshield, through the use of a scrapper blade and deicing fluid, whereby the deicing fluid is released form a fluid release nozzle attached to the bracket of the scrapper blade.

In this respect, the heated wiper blade with a scraper and fluid release nozzle assembly according to the present invention substantially departs from the conventional concepts and designs of the prior art, and in doing so provides an apparatus primarily developed for the purpose of melting ice and mechanically clearing ice and fluid from a windshield with the aid of a chemical deicer.

Therefore, it can be appreciated that there exists a continuing need for a new and improved heated wiper blade with a scraper and fluid release nozzle assembly which can be used for to melting ice and mechanically clearing ice and fluid from a windshield with the aid of a chemical deicer. In this regard, the present invention substantially fulfills this need.

SUMMARY OF THE INVENTION

In view of the foregoing disadvantages inherent in the known types of wiping devices now present in the prior art, the present invention provides an improved heated wiper blade with a scraper and fluid release nozzle assembly. As such, the general purpose of the present invention, which will be described subsequently in greater detail, is to provide a new and improved heated wiper blade with a scraper and fluid release nozzle assembly and method which has all the advantages of the prior art and none of the disadvantages.

To attain this, the present invention essentially comprises a wiper arm member coupled to a wiper shaft of an associated vehicle. An elongated wiper blade with an interior heating element is included. The interior heating element extending linearly through the wiper blade. Included is a blade holder member pivotally mounted to a distal end of the wiper arm member with a fastening bracket. The blade holder supports the wiper blade in an engaging orientation relative to a windshield of the associated vehicle. An electrical conductor is coupled to the wiper arm member for communicating with a battery of the associated vehicle. Also, a heat generating mechanism provided. The heat generating mechanism has a first exterior heating element and a second exterior heating element. The first and second exterior heating elements are each in electrical communication with the electrical conductor and on opposite sides of the conductor. The first exterior heating element extends along a first portion of the blade holder, and terminates laterally of the blade holder in a first distal end. The first distal end has a first electrical end connector. The first electrical end connector is coupled to and in electrical communication with the interior heating element of the wiper blade. The second exterior heating element extends along a second portion of the blade holder, and terminates laterally of the blade holder in a second distal end. The second distal end has a second electrical end connector. The second electrical end connector is coupled to and in electrical communication with the interior heating element of the wiper blade. The first electrical end connector and the second electrical end connector are connected simultaneously with the wiper blade. Additionally, an L-shaped scraping blade is coupled to a central bracket that is fixedly attached to an underside of the blade holder. The scraping blade is positioned between the blade holder and associated wiper blade, and is generally vertical each. The scraper blade is rotatable about an end edge of the central bracket to allow movement away from and into the windshield. Lastly, a fluid release nozzle is fixedly attached to the central bracket and spaced from the blade holder. The fluid release nozzle has a tube. The tube is coupled to the nozzle and extends to a fluid container that is housed within the vehicle. The fluid release nozzle is capable of spraying a deicing fluid onto the windshield. Whereby, the wiper blade is heated by the heating mechanism while moving over the windshield. The spray of deicing fluid and the scraper blade all assist in the continual removal of ice from the windshield of the associated vehicle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved heated wiper blade with a scraper and fluid release nozzle assembly which has all of the advantages of the prior art wiping devices and none of the disadvantages.

It is another object of the present invention to provide a new and improved heated wiper blade with a scraper and fluid release nozzle assembly which may be easily and efficiently manufactured and marketed.

It is further object of the present invention to provide a new and improved heated wiper blade with a scraper and fluid release nozzle assembly which is of durable and reliable constructions.

An even further object of the present invention is to provide a new and improved heated wiper blade with a scraper and fluid release nozzle assembly which is susceptible of a low cost of manufacture with regard to both materials and labor, and which accordingly is then susceptible of low prices of sale to the consuming public, thereby making such heated wiper blade with a scraper and fluid release nozzle assembly economically available to the buying public.

Still yet another object of the present invention is to provide a new and improved heated wiper blade with a scraper and fluid release nozzle assembly which provides in the apparatuses and methods of the prior art some of the advantages thereof, while simultaneously overcoming some of the disadvantages normally associated therewith.

Even still another object of the present invention is to provide a heated wiper blade with a scraper and fluid release nozzle assembly for to melting ice and mechanically clearing ice and fluid from a windshield with the aid of a chemical deicer.

Lastly, it is an object of the present invention to provide a new and improved heated wiper blade with a scraper and fluid release nozzle assembly including a wiper arm member that couples to a wiper shaft of an associated vehicle. An elongated wiper blade with an interior heating element is provided. A blade holder member is pivotally mounted to a distal end of the wiper arm member with a fastening bracket, and supports the wiper blade. An electrical conductor is coupled to the wiper arm member for communicating with a battery of an associated vehicle. A heat generating mechanism is in electrical communication with the electrical conductor. The heat generating mechanism couples with the blade holder member and the interior heating element. A scraping blade coupled to a central bracket of the blade holder. Lastly, a fluid release nozzle is attached to the central bracket and spaced from the blade holder for spraying a deicing fluid onto the windshield to assist the scraping blade removal of ice from the windshield of the associated vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
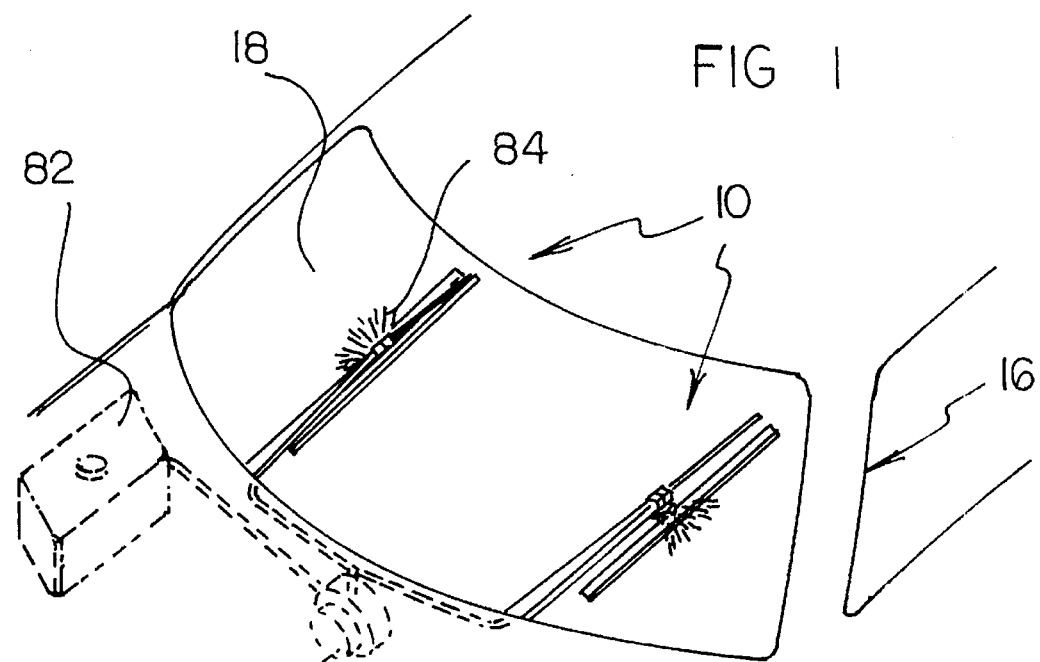
FIG. 1 is a perspective view of the preferred embodiment of the heated wiper blade with a scraper and fluid release nozzle assembly constructed in accordance with the principles of the present invention.

With reference now to the drawings, and in particular to FIG. 1 thereof, the preferred embodiment of the new and improved heated wiper blade with a scraper and fluid release nozzle assembly embodying the principles and concepts of the present invention and generally designated by the reference numeral 10 will be described.

The present invention, the heated wiper blade with a scraper and fluid release nozzle assembly 10 is comprised of a plurality of components. Such components in their broadest context include a wiper arm, a wiper blade and holder, a scraping blade, and a series of heating elements. Such components are individually configured and correlated with respect to each other so as to attain the desired objective.

Specifically, the present invention includes a wiper arm member 12. As seen in FIG. 1, the wiper arm member couples to a wiper shaft of an associated vehicle 16. The wiper arm member and the wiper shaft are formed of known material that is currently being used to made windshield wipers for vehicles. As shown in FIG. 1, the wiper shaft provides the standard movement of the wiper arm member about the windshield 18 of the associated vehicle.

Figure 4:
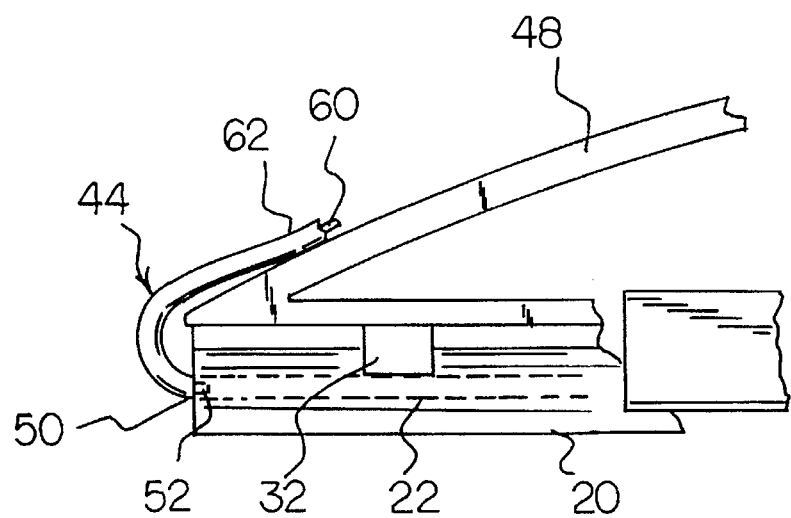
FIG. 4 is an enlarged side elevational view of an edge portion of the present invention as set forth in FIG. 2.
Figure 5:
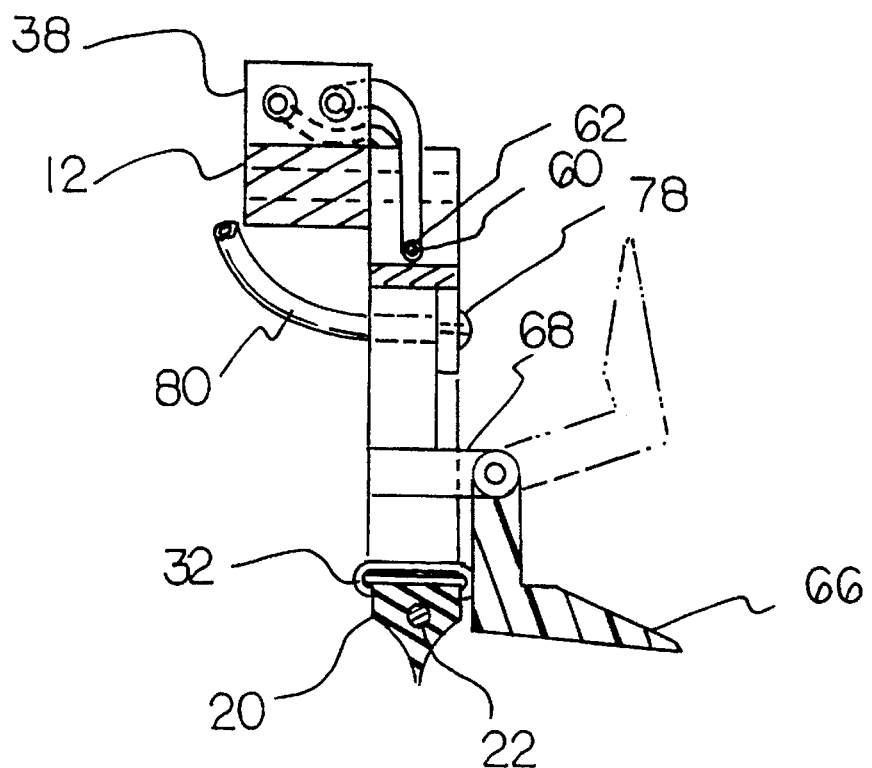
FIG. 5 is a cross sectional view of the present invention taken along line 5—5 of FIG. 3.

Included is an elongated wiper blade 20. The profile of the wiper blade, as shown in FIG. 5, is conventional. The wiper blade is formed of a thermoplastic rubber. The wiper blade has an interior heating element 22 extending linearly through the wiper blade as seen in FIG. 4. The heating element is a conventional resistance heating element.

Figure 3:
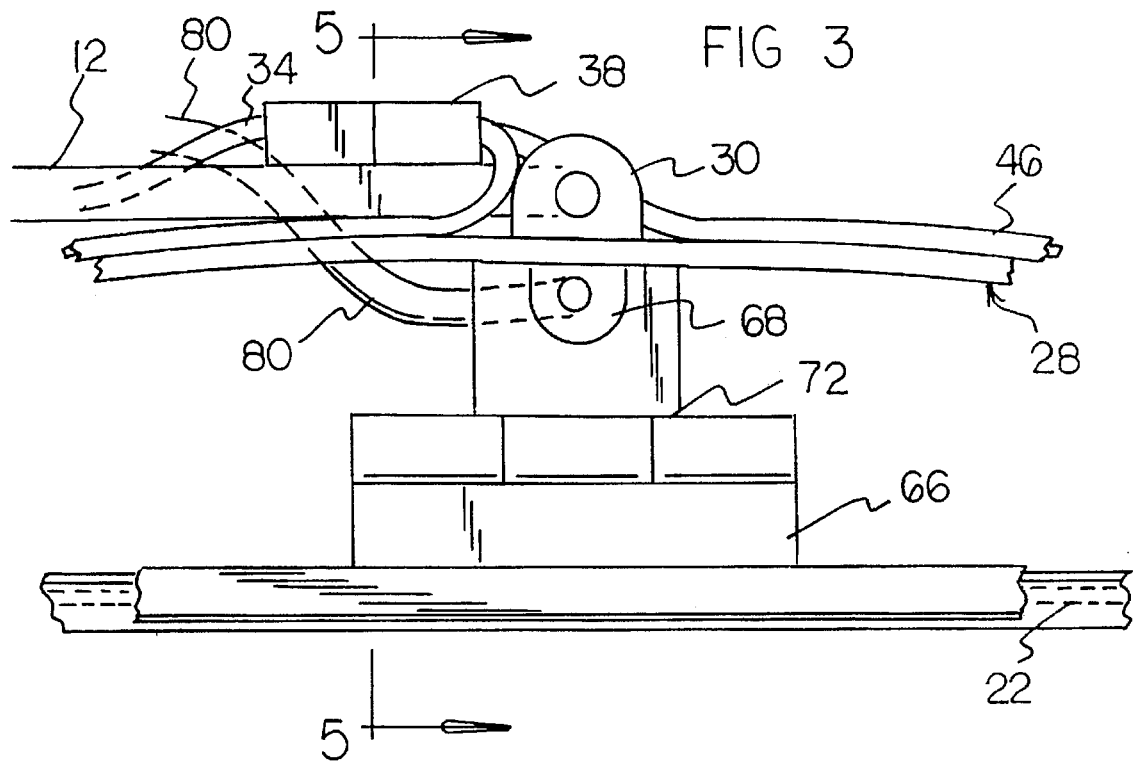
FIG. 3 is an enlarged side elevational view of a section of the invention as set forth in FIG. 2.

Also, included is a blade holder member 28 pivotally mounted to a distal end of the wiper arm member 12. As shown in FIG. 3, the blade holder is mounted with a swivel connector 30. The blade holder supports the wiper blade 20 in an engaging orientation relative to a windshield 18 of the associated vehicle. The blade holder has bent-over tabs 32 that secure the wiper blade within the blade holder. The swivel connector is coupled to the approximate center point of the blade holder. The swivel connector permits selective decoupling of the blade holder and the associated wiper blade from the wiper arm for replacement of the blade holder.

Additionally, an electrical conductor 34 is coupled to the wiper arm member 12. Each wiper arm of the pair of arms, as seen in FIG. 1, has the electrical conductor depicted in FIG. 3. Each electrical conductor is in communication with a battery 36 of the associated vehicle. Selective operation of the invention occurs when an unlabeled switch is used to control the electrical impulse to the electrical conductor of each wiper arm. The electrical conductor is attached to a central connector 38, as seen in FIG. 3. The central connector is coupled to the wiper arm member near the distal end thereof.

Figure 6:
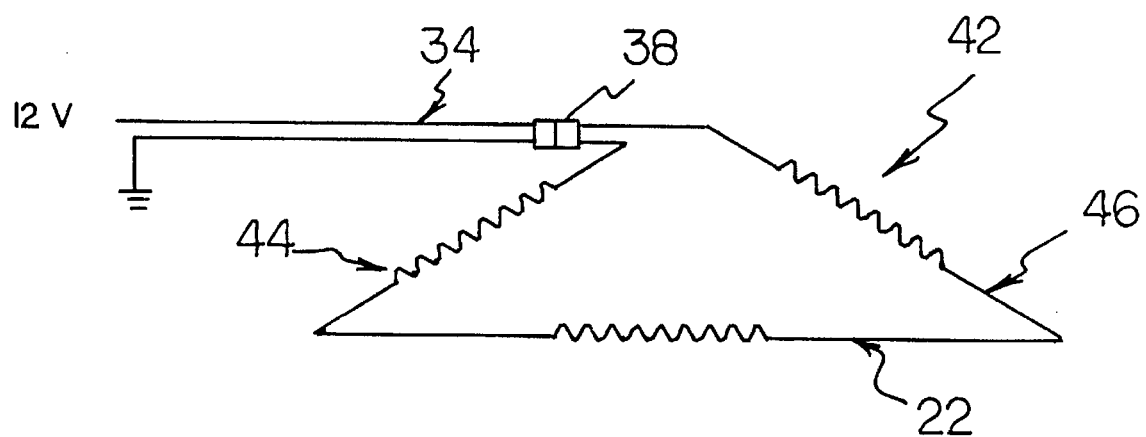
FIG. 6 is an electrical schematic of the series circuit of the present invention of the prior Figures.

A heat generating mechanism 42 is provided and as shown by the schematic of FIG. 6. The heating generating mechanism in the preferred embodiment has two temperature settings. A first setting is to be used at temperatures between 20 and 32 degrees Fahrenheit. The second setting is to be used at temperatures below 20 degrees Fahrenheit. The heat generating mechanism has a first exterior heating element 44 and a second exterior heating element 46. The first and second exterior heating elements are each in electrical communication with the electrical conductor by way of the central connector 38. The first and second exterior heating elements extend from the same side of the central connector and a side opposite the electrical conductor 34.

The first exterior heating element 44 extends along a first portion 48 of the blade holder 28. The first exterior heating element terminates laterally of the blade holder in a first distal end 50. As illustrated in FIG. 4, the first distal end has a first electrical end connector 52 coupled thereto and in electrical communication with the interior heating element 22 of the wiper blade.

Figure 2:
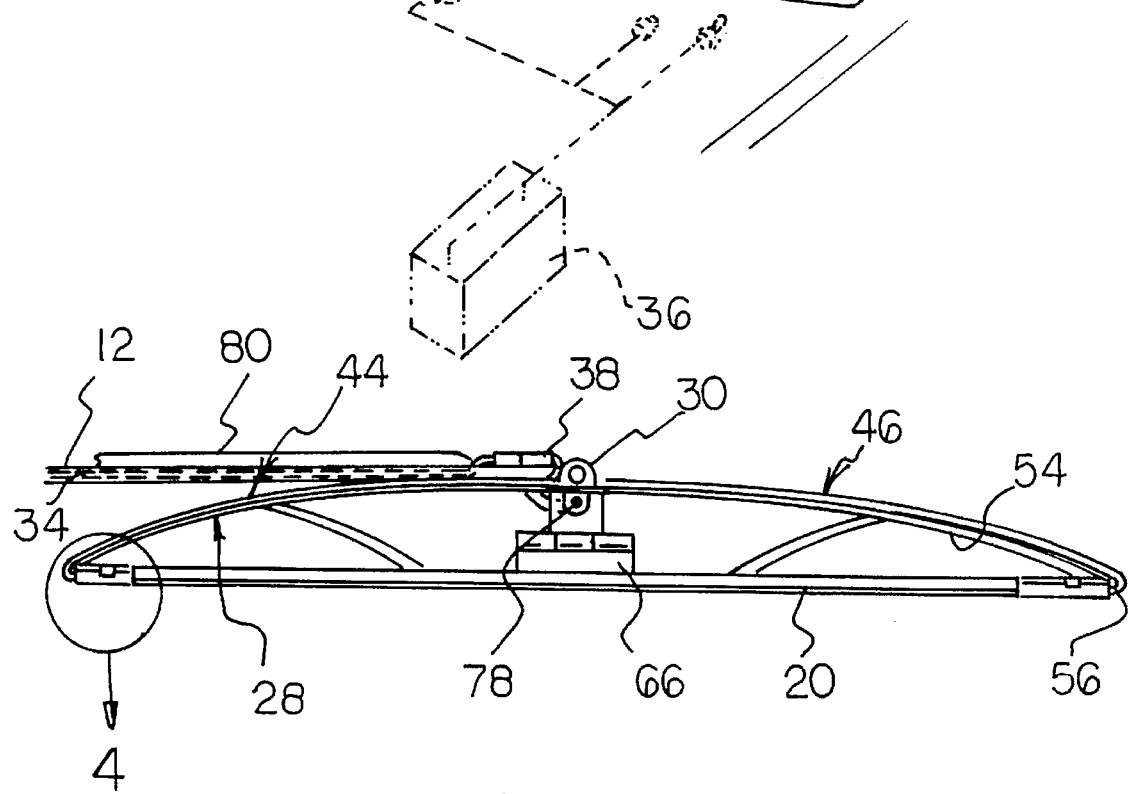
FIG. 2 is a side elevational view of the invention in an operational configuration.

The second exterior heating element 46 extends along a second portion 54 of the blade holder. The second exterior heating element terminates laterally of the blade holder in a second distal end 56. The second distal end has a second electrical end connector. The second electrical connector is not shown, but it is coupled to second distal end in the same manner as the first electrical connector is coupled. The second electrical connector is in electrical communication with the interior heating element 22 of the wiper blade. As seen in FIG. 2, the first and second electrical end connectors are simultaneously in communication with the interior heating element.

As best illustrated in FIG. 4, each of the exterior heating elements are comprised of a resistive element 60 encapsulated by a diffusion coating 62. The diffusion coating is a thermally conductive dielectric material bonded to an upper surface of the first and second portion of the blade holder. The diffusion coating is able to conduct heat from the resistive element to the blade holder. When the blade holder is heated in this manner it is able to melt ice encapsulated therearound. The diffusion coating serving to protect the resistive element and preclude electrical communication between the resistive element and the blade holder.

Referring now to FIG. 6, it can be shown that when the first 44 and second 46 exterior heating elements are connected to the interior heating element 22 a series arrangement is formed. This arrangement allows the current to pass through the electrical conductor 34 for resistive heat of the blade holder and the wiper blade. The releasable connection between the interior heating element 22 and the exterior heating elements permit selective replacement of the wiper blade as the thermoplastic rubber of the blade degrades with use.

FIG. 5 shows an L-shaped scraping blade 66 is coupled to a central bracket 68. The central bracket is fixedly attached to an underside 70 of the blade holder 28. The scraping blade is formed of a thermoplastic resin. The scraping blade is positioned between the blade holder and associated wiper blade 20. The scraping blade is generally vertical each and capable of moving in conjunction with the movement of the blade holder. The scraping blade is rotatable about an end edge 72 of the central bracket to allow movement away from and into the windshield. The scraping blade is capable of scraping and clearing large chunks of ice from the windshield as the wiper arm moves over the windshield.

Lastly, a fluid release nozzle 78 is fixedly attached to the central bracket 68. The nozzle is spaced from the underside of the blade holder, as shown in FIG. 3. The fluid release nozzle has a tube 80 coupled thereto. The tube extends along the wiper arm member and into a fluid container that is housed within the vehicle 16. The fluid release nozzle releases a spray 84 of a deicing fluid onto the windshield. The deicing fluid is any one of the commercially available fluids currently being sold. The spray is projected over the wiper blade and onto the windshield. Whereby the wiper blade when heated moves over the windshield, the spray of deicing fluid may be released and the scraper blade clears the ice, all in cooperation for the continued removal of ice from the windshield of the associated vehicle.

In, use the heated wiper blade with a scraper and fluid release nozzle assembly for deicing a windshield can be easily installed. The vehicle requires two of the inventions for correct operation. Any one of the wiper blades of the present invention may be purchased separately for replacement. The heated wiper blade and holder, the scraping blade and the fluid all cooperate to aid the driver of the vehicle in removing ice from the windshield.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A heated wiper blade with a scraper and fluid release nozzle assembly for deicing a windshield comprising in combination:

an elongated wiper arm member having first and second ends, said first end for coupling to a wiper shaft of an associated vehicle;

an elongated wiper blade having a first heating element embedded therein and extending linearly therethrough;

a blade holder member having an upper side and an under side, said blade holder member pivotally mounted on said upper side to a first second end of the wiper arm member by a swivel connector the blade holder supporting the wiper blade in an engaging orientation relative to a windshield of the associated vehicle;

an electrical conductor being coupled to the wiper arm member for communicating with a battery of the associated vehicle;

a heat generating mechanism having a first exterior heating element and a second exterior heating element, the first and second exterior heating elements each being in electrical communication with the electrical conductor;

the first exterior heating element extending along a first portion of the blade holder to terminate laterally of the blade holder in a first distal end, the first distal end having a first electrical end connector coupled thereto and being in electrical communication with the first heating element of the wiper blade;

the second exterior heating element extending along a second portion of the blade holder to terminate laterally of the blade holder in a second distal end, the second distal end having a second electrical end connector coupled thereto and being in electrical communication with the first heating element of the wiper blade simultaneously with the first electrical end connector;

an L-shaped scraping blade coupled to a central bracket, said central bracket fixedly attached to said underside of the blade holder, the scraping blade positioned between the blade holder and the wiper blade, the scraper blade being rotatable about an end edge of the central bracket to allow movement away from and into engagement with the windshield; and a fluid release nozzle fixedly attached to the central bracket and spaced from the blade holder, the fluid release nozzle having a tube coupled thereto and extending to a fluid container being housed within the vehicle, the fluid release nozzle being capable of spraying a deicing fluid onto the windshield, whereby the wiper blade being heated by the heating mechanism while moving over the windshield, the spray of deicing fluid and the scraper blade all assist in continued removal of ice from the windshield of the associated vehicle.

2. A heated wiper blade with a scraper and fluid release nozzle assembly, said blade comprising:

an elongated wiper arm member having first and second ends, said first end for coupling to a wiper shaft of an associated vehicle;

an elongated wiper blade having first heating element embedded therein;

an elongated blade holder member having an upper side and an underside, said blade holder member pivotally mounted on said upper side to said second end of the wiper arm member by a swivel connector, said blade holder coupled to and supporting said wiper blade;

an electrical conductor being coupled to the wiper arm member for communicating with a battery of an associated vehicle;

a heat generating mechanism being in electrical communication with the electrical conductor and the first heating element, the heat generating mechanism being mounted to and extending along the blade holder member and copied to the first heating element of the wiper blade for effecting a melting of ice located proximal thereto;

an elongated scraping blade pivotally coupled to a central bracket attached to the underside of the blade holder and capable of movement away from and into engagement with the windshield; and a fluid release nozzle attached to and supported by the central bracket and spaced from the blade holder for spraying a deicing fluid onto the windshield to assist the scraping blade removal of ice from the windshield of the associated vehicle.

3. The heated wiper blade with a scraper and fluid release nozzle as set forth in claim 2, wherein the blade holder positions the wiper blade in an engaging orientation relative to a windshield of the associated vehicle.

4. The heated wiper blade with a scraper and fluid release nozzle as set forth in claim 2, wherein the heat generating mechanism has a first exterior heating element and a second exterior heating element in communication with the electrical conductor.

5. The heated wiper blade with a scraper and fluid release nozzle as set forth in claim 4, wherein the first exterior heating element extends along a first portion of the blade holder and terminates laterally of the blade holder in a first distal end.

6. The heated wiper blade with a scraper and fluid release nozzle as set forth in claim 5, wherein the first distal end having a first electrical end connector coupled thereto and being in electrical communication with the interior heating element of the wiper blade.

7. The heated wiper blade with a scraper and fluid release nozzle as set forth in claim 4, wherein the second exterior heating element extending along a second portion of the blade holder to terminate laterally of the blade holder in a second distal end.

8. The heated wiper blade with a scraper and fluid release nozzle as set forth in claim 7, wherein the second distal end having a second electrical end connector coupled thereto and being in electrical communication with the interior heating element of the wiper blade.

9. The heated wiper blade with a scraper and fluid release nozzle as set forth in claim 4, wherein the first and second exterior heating elements including a resistive element encapsulated by a diffusion coating for conducting heat from the resistive element to the blade holder.

10. The heated wiper blade with a scraper and fluid release nozzle as set forth in claim 2, wherein the scraping blade being L-shaped and positioned between the blade holder and associated wiper blade, and the scraper blade being rotatable about an end edge of the central bracket.

11. The heated wiper blade with a scraper and fluid release nozzle as set forth in claim 2, wherein the fluid release nozzle having a tube coupled thereto and extending to a fluid container being housed within the vehicle and controlled by a switch within the associated vehicle.

* * * * *